United States Patent [19]
Alleaume

[11] 3,770,158
[45] Nov. 6, 1973

[54] DEVICE FOR PROTECTING THE ENVIRONMENT OF A TANK AGAINST FAILURES THEREOF

[75] Inventor: Jean H. Alleaume, Saint-Cloud, France

[73] Assignee: Technigaz, Paris, France

[22] Filed: Oct. 29, 1971

[21] Appl. No.: 193,798

[30] Foreign Application Priority Data
May 24, 1971 France .............................. 7118702

[52] U.S. Cl. ............. 220/9 LG, 220/9 A, 114/74 A
[51] Int. Cl. ............................................ B65d 25/18
[58] Field of Search ................. 220/9 A, 9 LG, 9 R; 114/74 A; 62/45, 55

[56] References Cited
UNITED STATES PATENTS

| 3,692,205 | 9/1972 | Cowles et al. | 220/9 LG |
| 3,319,431 | 5/1967 | Clarke et al. | 220/9 LG |
| 3,347,402 | 10/1967 | Forman et al. | 114/74 A |
| 3,583,352 | 6/1971 | Alleaume | 114/74 A |

FOREIGN PATENTS OR APPLICATIONS

| 234,484 | 7/1959 | Australia | 220/9 LG |

Primary Examiner—William T. Dixson, Jr.
Assistant Examiner—Steven M. Pollard
Attorney—Francis T. Carr et al.

[57] ABSTRACT

A device for protecting the environment of a storage tank against failures thereof, said tank containing liquefied gas at low temperature and at a pressure about atmospheric pressure and being housed in a heat-insulated compartment of a ship hold, said device comprising a fluid-tight, concave dished structure forming a reduced secondary barrier arranged below and about the lower portion of said tank.

7 Claims, 5 Drawing Figures

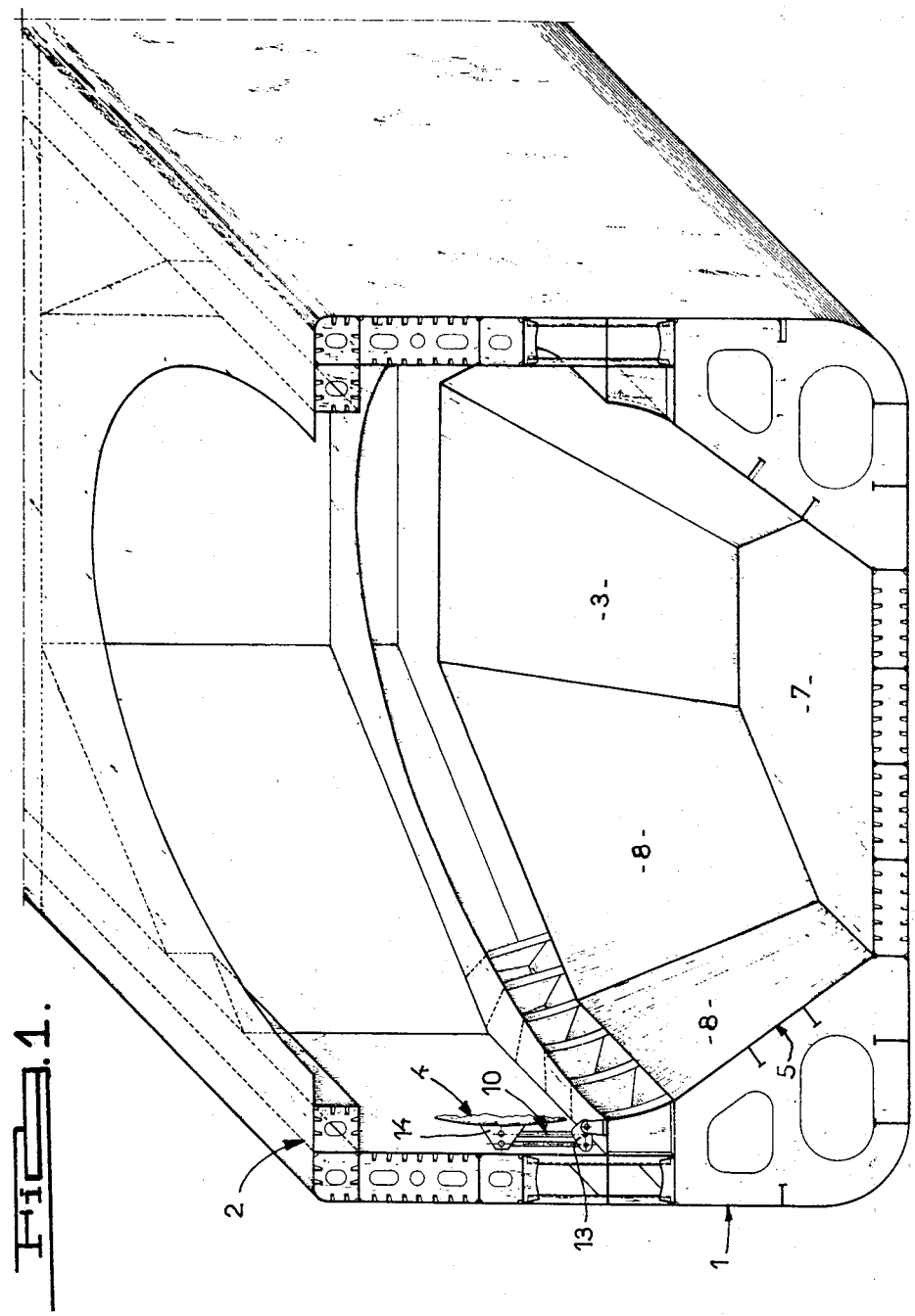

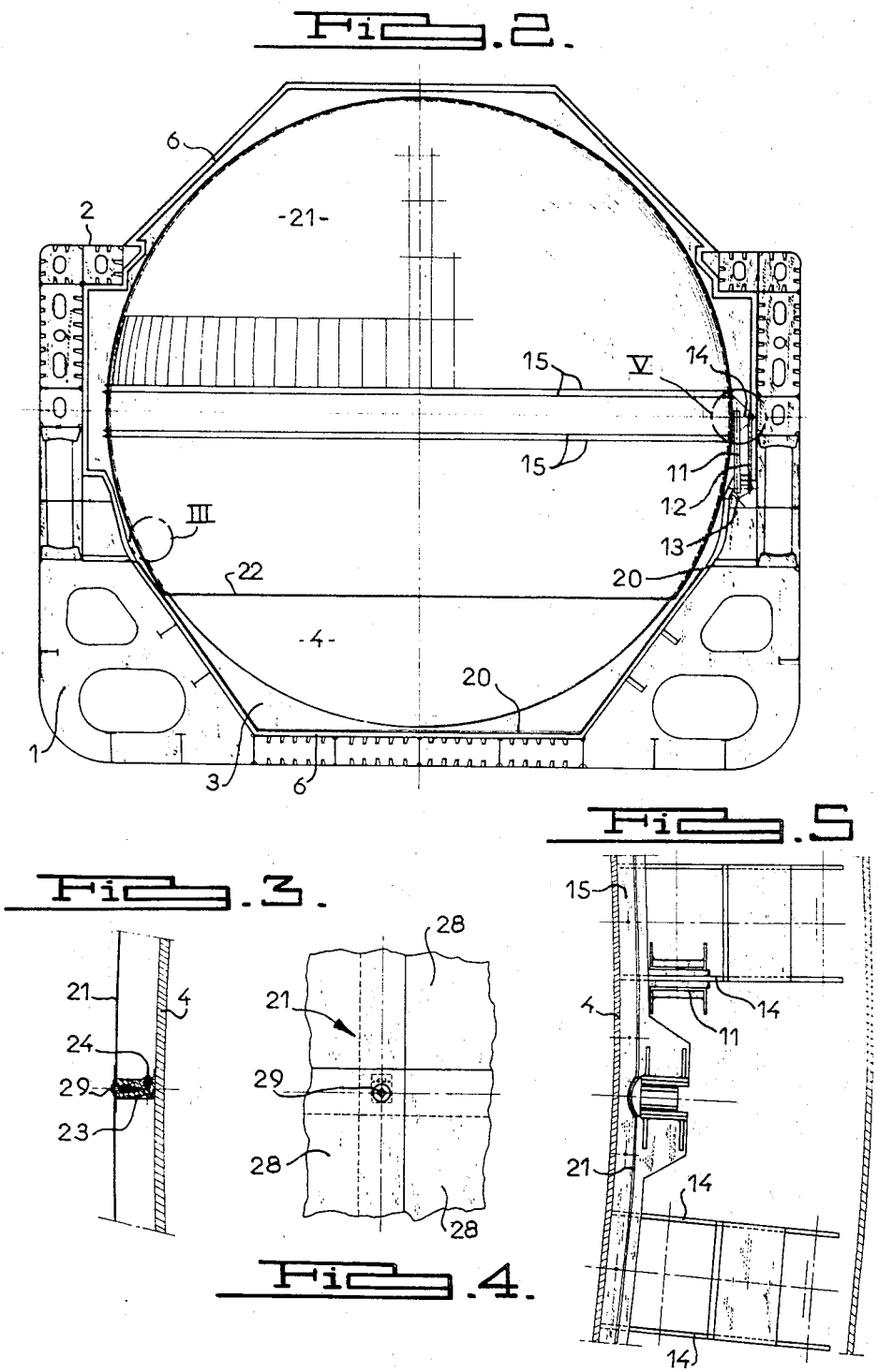

DEVICE FOR PROTECTING THE ENVIRONMENT OF A TANK AGAINST FAILURES THEREOF

The present invention relates essentially to a device for protecting the environment of a storage tank against failures thereof and is applicable for instance to storage tanks conveyed on ships.

In particular, in the case of tanks for storing liquefied natural gases conveyed on ships, some official regulations prescribe the presence of a protective envelope, casing or shell forming a secondary barrier between the tank and the ship's hull for obviating the failures of said tank.

Such a secondary barrier being very expensive, various means have been investigated for dispensing therewith in particular by using self-supporting storage tanks for natural gases liquefied at a very low temperature, which have been designed to withstand high inner pressures and which were actually used for inner pressures hardly above atmospheric pressure. Thus was achieved a very large safety margin allowing to dispense with the secondary barrier. Such a solution was obviously of a very high cost price in particular for storage tanks of large capacities.

In the case of storage tanks of large capacities designed for pressures not very much higher than the atmospheric pressure, the aforesaid regulations require the presence of a secondary barrier providing a protection of the hold and of the hull against gradual tank failures, i.e., crackings of the wall without any sudden bursting or breaking.

The object of the invention is just to provide a device for protecting the environment of a tank against failures thereof, said tank, which contains a liquefied gas at a low temperature and at a pressure about the atmospheric pressure, being accommodated or housed in a heat-insulated compartment or chamber of a ship hold, said protective device being characterized in that it comprises a fluid-tight, concave dished structure or bowl forming a reduced secondary barrier which is arranged below and about the lower portion of said tank.

Another characterizing feature of the invention is that it comprises an anti-jet or jet shielding envelope, casing or shell surrounding and confirming substantially at least to the upper portion of said tank and extending with its lower portion into said dished structure or bowl.

Moreover said dished structure or bowl consists of a thin envelope made for example from metal sheet and rests or bears directly like a semi-integrated tank on the lining, facing or lagging forming a heat insulation covering the walls of said compartment.

The invention therefore proposes a reduced secondary barrier combined with an anti-jet envelope resulting in an efficient and inexpensive solution of the problem raised by the protection of the environment of storage tanks for liquefied natural gases, which is moreover feasible very simply with conventional engineering processes.

Furthermore, since the invention is applicable with advantage to storage tanks housed in heat insulated compartments of a ship, it enables to completely separate the two functions of heat insulation and of protection from each other according to official regulations without resorting to a device designed for meeting both of these two functions at the same time, which device would only be a compromise obtained to the detriment of each one of said functions.

The invention will be better understood and further objects, characterizing features, details and advantages thereof will appear more clearly as the following explanatory description proceeds with reference to the accompanying diagrammatic drawings given by way of example only illustrating a form of embodiment of the invention and wherein :

FIG. 2 is a cross-sectional perspective view of the hull of a ship showing the compartment housing a tank ;

FIG. 2 is a partial cross-sectional view of the tank assembly provided with a device according to the invention and accommodated within the compartment shown in FIG. 1 ;

FIG. 3 is an enlarged sectional view of the circled detail III of FIG. 2 ;

FIG. 4 is a view seen from the left of the detail shown in FIG. 3 ; and

FIG. 5 is an enlarged top view of the encircled detail V of FIG. 2.

In FIG. 1 has been shown a cross-sectional perspective view of a ship, the section being taken substantially along a diameter of a compartment wherein will be housed a storage tank of large capacity.

In this examplary embodiment, the ship comprises a double-walled hull generally designated by the reference numeral 1 and is provided at its upper portion with a main deck 2. The ship comprises several successive adjacent compartments 3 provided in the ship's hold and wherein are mounted spherical storage tanks 4 (as shown in FIG. 2).

As shown in FIG. 1, the inner walls 5 of the compartment 3 are desirably covered or lined on their faces exposed towards the storage tank with a layer 6 of suitable heat-insulating material such as for instance polyurethane.

This layer of heat-insulating material extends over the whole storage tank 4 mounted in the compartment 3 to limit the heat flow entering the storage tank (which for example contains a liquefied natural gas at a very low temperature) on the one hand and to protect the metal hull structures 1 against the very low temperatures thereby enabling in addition the hull to be built from steels of conventional grades, on the other hand.

With a view to simplify the construction, the bottom of the compartment 3 is not of semi-spherical shape but exhibits a concave polyhedral configuration provided by the assembly of a flat bottom 7 with flat panels 8 for the side walls, the panels 8 extending in this example over approximately the lower quarter portion of said tank.

The spherical storage tank 4 is supported by means of fastening arrangements or holders 10 which comprise a kind of parallel motion structure consisting of a pair of substantially vertical links or rods 11 and 12 mounted on the one hand on a member 13 rigidly connected to the hull and on the other hand pivotally connected at their top ends to a triangular bracket 14 welded to the outer wall of the tank 4 substantially in the horizontal diametral plane of said tank. Moreover the tank is provided with anti-roll and anti-pitch anchoring means not shown in the drawings which are attached by one end to substantially horizontal rings 15 surrounding the tank whereas they are fastened on the other hand to the hull with their other ends.

Such anchoring means are well known in the art and will not be described herein more in detail.

In FIG. 2 is shown the tank 4 provided with the protective device according to the invention and mounted within a compartment 3 of a ship's hold.

The layer 6 of heat-insulating material completely surrounds the storage tank 4 by extending outside of said tank as well as of its fastening supporting means and anti-roll and anti-pitch anchoring means. At the lower portion of the compartment 3 is directly provided on the insulating lining 6 a fluid-tight vat or like dished construction 20 of concave configuration forming a reduced secondary barrier which surrounds the lower portion of the tank 4.

This vat or cup-shaped construction 20 is in the embodiment shown in particular in FIGS. 1 and 2 of polyhedral shape corresponding substantially to the inner surface of the compartment 3 and consists like said compartment 3 or flat panels forming the side walls and of a flat bottom.

The flat portions of the vat 20 are desirably supported directly like an integrated tank by the insulating lining 6 covering the walls and the bottom of the compartment 3 whereas the edges and corners formed by the junctions of said flat portions are self-supporting and slightly spaced from said insulating lining.

The vat 20 forming a reduced secondary barrier is desirably made from thin metal sheets adapted to withstand low temperatures, such as for example from aluminium sheets of a thickness ranging from about 3 to 5 mm.

Moreover the device according to the invention comprises an anti-jet envelope 21 surrounding and conforming substantially to at least the upper portion of the tank 4 and extending slightly with its lower part 22 into the vat 20.

This envelope or sheathing forms an anti-jet shield the purpose of which is to direct towards the vat the jets, gushes, spurts or blasts of liquefied gas escaping or leaking from the tank through small cracks. It is therefore made from an assembly of thin metal sheets such as for example aluminium sheets with a thickness of about 1 mm which are mounted in this case in non fluid-tight free overlapping relationship and kept slightly spaced from the tank 4 by means for example of wooden blocks, pads or plugs 23 serving also to fasten said envelope 21 onto the tank 4 and shown in detail in FIGS. 3 and 4.

The wooden blocks or pads 23 are secured by all suitable means to the outer surface of the tank 4, i.e., for example clipped or clamped or fastened on said wall by means of angle pieces 24 one flange of which is secured by screws 26 to the block 23, the other flange being brazed or welded to the wall of the tank 4. The thin metal sheets 28 forming the anti-jet envelope are desirably secured by screws 29 or the like to the wooden blocks 23 for instance at the location where said metal sheets overlap each other.

It should be noted moreover in particular in FIGS. 2 and 5 that the anti-jet envelope 21 extends inside of the discontinuities produced by the aforesaid fastenings of the tank to the ship's hull thereby offering the advantage to protect said fastenings against jets, gushes, spurts or blasts of liquefied gas which would issue from crackings of the tank.

The anti-jet envelope 21 is therefore mounted on at least the whole upper portion of said tank and extends slightly into the vet 20 which may thus serve as a retention container for the liquefied gas in the case of a significant cracking of the tank. It is obvious that without departing from the gist or scope of the invention it is possible to provide said vat with a system for discharging away the liquefied gas which would be contained therein or with a system for recycling the liquefied gas.

Furthermore the invention has been described in the case of a spherical tank but may also be applied to any tank shape such as for instance a cylindrical tank with a circular or polygonal cross-sectional contour.

It should therefore be understood that the invention is not at all limited to the form of embodiment described and shown which has been given by way of example only. In particular it comprises all the means forming technical equivalents to the means described as well as their combinations if same are carried out according to the gist of the invention and used within the scope of the appended claims.

What is claimed is:

1. A device for protecting the environment of a storage tank against failures thereof, said tank serving to contain a liquefied gas at a low temperature and at about atmospheric pressure, being housed in a heat-insulated compartment of a ship's hold and being supported by fastening and supporting means to extend into said compartment, the inner walls of said compartment being lined with a layer of heat-insulating material with said layer also surrounding the entire tank, said device comprising a concave fluid-tight vat disposed in said compartment below and about the lower portion of said tank and an anti-jet envelope externally surrounding at least the upper portion of said tank, said concave vat being independent of said tank and comprising a thin-walled casing resting directly on said layer of heat-insulating material lining the inner walls of said compartment, said anti-jet envelope conforming in shape substantially to at least the upper portion of said tank and extending at its lower portion into said concave vat, and said envelope comprising thin sheets of metal capable of withstanding low temperatures arranged in non fluid-tight free overlapping relationship and means for securing said sheets to the outer wall of said tank including wooden block members fixedly attached to said tank outer wall.

2. A device according to claim 1, wherein said anti-jet envelope extends inside of the discontinuities formed by said fastening and supporting means of said tank.

3. A device according to claim 1, wherein said vat has polyhedral shape which conforms substantially to the polyhedral shape of said compartment, the walls of said vat bearing on the bottom and against the sides of said compartment whereas the angles and corners formed by the junction of said walls of the vat are a rigid self-supporting structure and slightly spaced from the corresponding angles and corners of the walls of said polyhedral compartment.

4. In combination, a tanker having a compartment in its hold and a tank supported in said compartment and serving to contain liquefied gas at low temperature and at approximately atmospheric pressure, means for supporting said tank in said compartment in spaced relationship from walls defining said compartment, a layer of insulation material lining said walls of said compartment and also surrounding the entire tank, said compartment having less depth than the height of said tank so that an upper portion of said tank projects outwardly of said compartment above the level of said supporting means, a concave fluid-tight vat in said compartment supported by said layer of insulating material therein and underlying the lower portion only of the tank within said compartment, said vat being independent of said tank and comprising thin walled metallic elements resting directly on said layer of insulation material located within said compartment, an anti-jet envelope covering and conforming substantially to the shape of said tank at least at the upper portion thereof, the lower portion of said envelope extending into said vat to a level below the upper level of said vat but leaving the lower portion of said tank bare of said anti-jet envelope, said anti-jet envelope comprising thin metallic sheets capable of withstanding low temperatures disposed in non-fluid tight overlapping relationship, and means for securing said last-named sheets to said tank.

5. The combination as per claim 4 wherein said tank supporting means provides discontinuities in the insulative layer, and wherein said anti-jet envelope lies inside of said discontinuities.

6. The combination as per claim 4 wherein said compartment has polyhedral shape and said concave vat conforms substantially to the polyhedral shape of said compartment, said thin walled elements of said vat bearing against the bottom of said compartment and its side walls with angular corners defined by abutting edges of said elements joined as a rigid self-supporting structure slightly spaced from corresponding angular corners defined by the polyhedral compartment.

7. A device for protecting the ambient environment against leakage failures of a tank containing liquefied gas at low temperature and at about atmospheric pressure, said tank being supported in a concave heat insulated compartment of a ship's hold, said compartment including an insulative lining layer of heat insulating material covering the walls of said compartment, and said lining layer also surrounding the entire tank, a concave fluid-tight vat within said compartment and supported directly by said lining layer, said vat being independent of said tank and being a thin metallic casing underlying and spaced from the lower portions only of said tank below the support level of said tank in said compartment, an anti-jet envelope surrounding all upper portions of said tank and also a limited portion of the tank below said support level, said anti-jet envelope comprising thin sheets of metal capable of withstanding low temperature conforming to the shape of the tank disposed in fluid-tight free overlapping relationship, and spacer means for securing the sheets of said envelope in spaced relationship to the outer wall of said tank, said spacer means including members secured to said outer wall, and means joining said sheets to said members.

* * * * *